April 14, 1931.  M. J. LEAHY  1,800,892
GAS TREATING APPARATUS
Filed Dec. 30, 1929  5 Sheets-Sheet 1

Inventor
Michael J. Leahy
By Brown & Phelps
Attorney

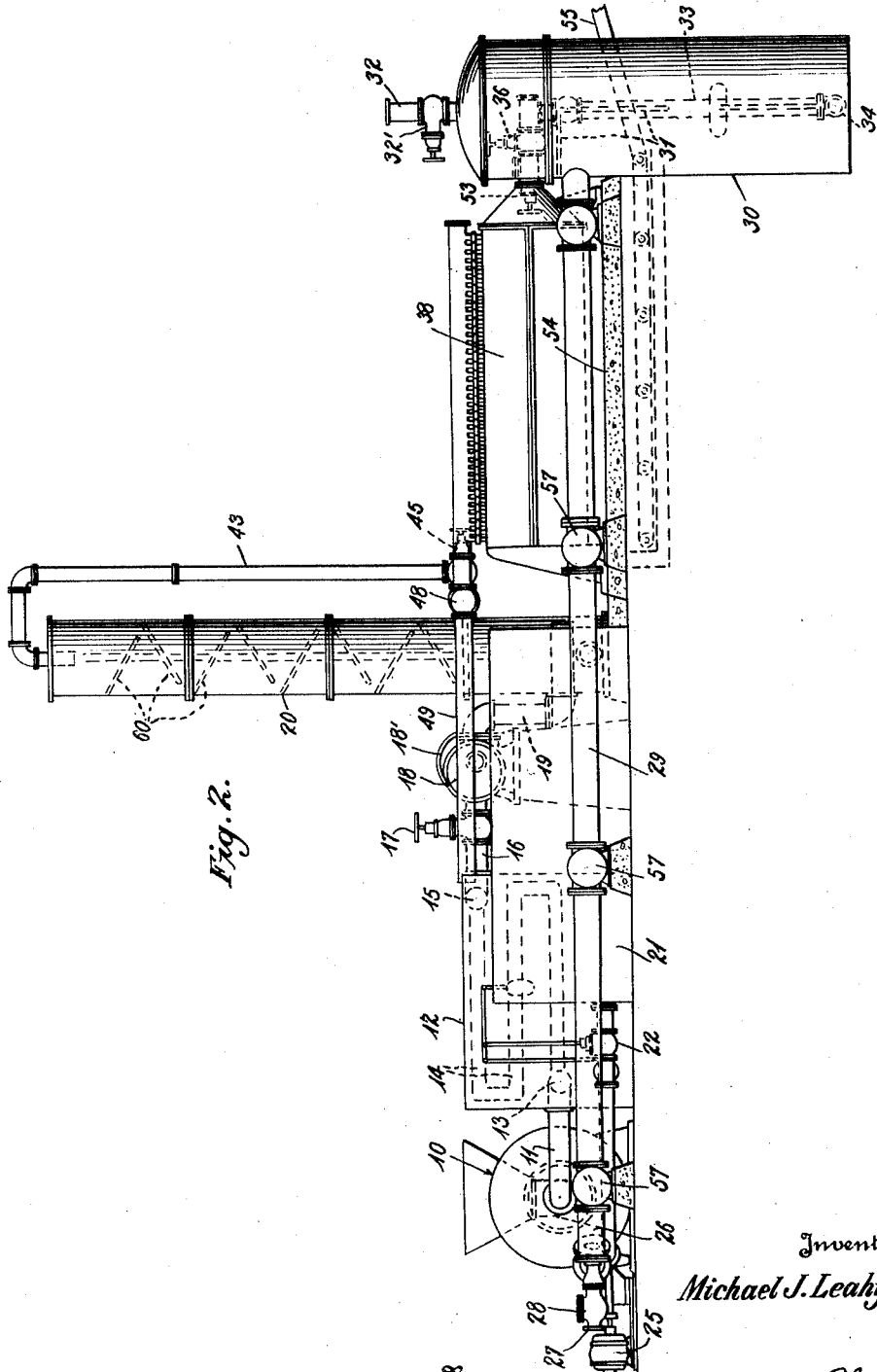

Patented Apr. 14, 1931

1,800,892

UNITED STATES PATENT OFFICE

MICHAEL J. LEAHY, OF MUNCY, PENNSYLVANIA

GAS-TREATING APPARATUS

Application filed December 30, 1929. Serial No. 417,504.

The invention relates to apparatus for treating gas, particularly for removing hydrogen sulphide therefrom.

It is an object of the invention to provide an apparatus for treating gases which will be continuous in operation.

It is a further object of the invention to provide an apparatus having a large capacity with a reasonably compact plant.

It is a further object of the invention to provide a gas treating apparatus having a novel device for contacting the gas with the treating solution.

It is a further object of the invention to provide an apparatus having means for recovering the sulphur precipitated in the process.

It is a further object of the invention to provide an apparatus having means for warming the treating solution, utilizing the heat of the activating gas whereby to cool the activating gas to a desired temperature.

It is a further object of the invention to provide apparatus having a novel form of activating tower.

Further objects of the invention will appear from the following description when read in connection with the accompanying drawings showing illustrative embodiments of the invention, and wherein:—

Fig. 2 is a side elevation;

Fig. 3 is an end view;

Fig. 4 is a plan view upon an enlarged scale and partly broken away to show the interior mechanism of the gas contacting device;

Fig. 5 is a central vertical section upon an enlarged scale of the reactivating tower;

Fig. 6 is a detail transverse section on line 6—6 of Fig. 5;

Fig. 7 is a plan view partly broken away showing a modified form of gas and liquid contact tube and separator;

Fig. 8 is a vertical section on line 8—8 of Fig. 7;

Figs. 9 and 10 are detail plan views of portions of the apparatus of Fig. 8;

Fig. 11 is a detail vertical section on line 11—11 of Fig. 7 drawn to an enlarged scale;

Fig. 12 is a side elevation partly in vertical section of a modified form of reactivating tower; and Figs. 13 and 14 are detail plan views upon an enlarged scale of trickling elements utilized in the tower of Fig. 12.

Figure 1:
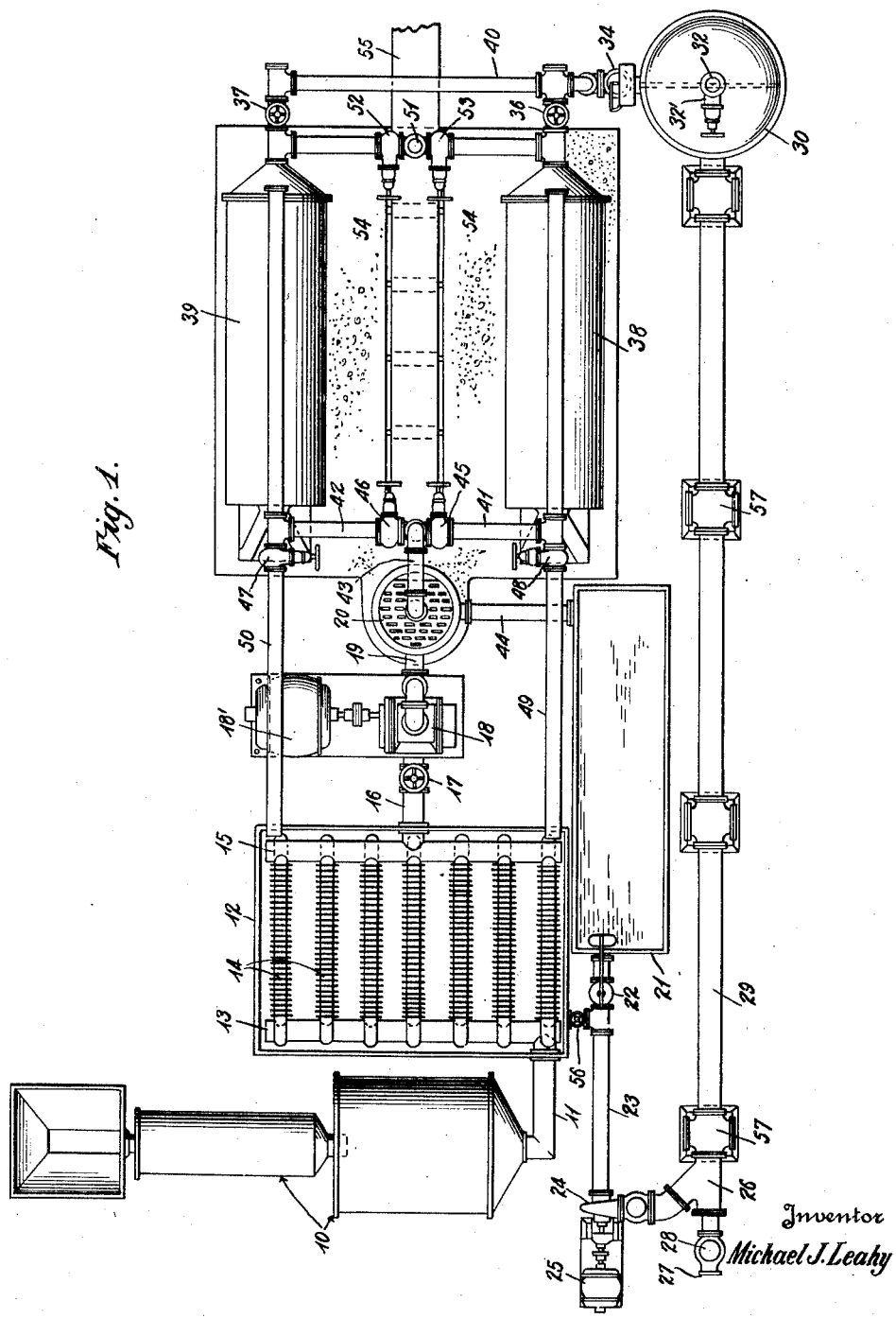
Fig. 1 is a plan view.

The process to be carried out by the apparatus has special reference to treating of combustible gases, as natural gas, and the object of the process is the removal of hydrogen sulphide from such gases to render them satisfactory for use. The process carried out by the apparatus involves the contacting of the gas to be treated with a liquid having sulphur oxides in absorption therein or in chemical union with material carried in solution thereby.

To produce $SO_2$ or other oxides of sulphur for use in the process, there is shown a sulphur burner 10 of any suitable type, the gases from which burner are led through conduit 11 to cooling coils arranged in a cooling tank 12, the conduit 11 leading to a header 13 connected with coils 14 desirably provided with fins for efficient heat exchange and the coils 14 in turn connected to a header 15 discharging through a conduit 16 equipped with a valve 17.

The conduit 16 is shown as communicating with a blower 18 driven by a motor 18' to discharge the gases through conduit 19 into the bottom of an activating tower 20 provided by the invention.

To supply activated solution for treatment of the gas, a quantity of solution is carried in a storage tank 21 discharging through a liquid level control valve 22 into conduit 23 and from conduit 23 the treating solution or liquid is driven by means of a pump 24 actuated by a motor 25 into a Y 26 to a second branch of which Y the gas is led through connection 27, a check valve 28 being provided to prevent reflux into the fitting 27. The Y 26 is shown as communicating with a contact tube 29. Passing through the tube 29 the gas is discharged into a separating drum 30 against a baffle 31 which projects downwardly in the drum and extends across the drum diametrically closing one-half of the drum above the inlet thereinto.

The mixture of gas and liquid discharged into the drum flows downwardly and about the lower edge of the baffle, the gas rising to the top of the drum beyond the baffle and the liquid gathering in the bottom of the drum, whereupon the gas separated from the liquid may flow off through a conduit 32, a valve 32′ being provided to control the flow.

The liquid from the drum 30 is led away through a vertical conduit 33, the flow of liquid being controlled by a liquid level control valve 34 and the liquid from the conduit 33 under control of valves 35, 36, 37 may be conducted to either of two filters 38 or 39. A conduit 40 is shown to conduct the liquid to filter 39. From the filters the liquid under pressure of pump 24 passes through conduit 41 or 42 through conduit 43 to the top of activating tower 20 where it flows downwardly over the perforated baffle plates in the tower and is thereby contacted with the gaseous oxides of sulphur flowing upwardly therein, the liquid flowing from the bottom of the tower through conduit 44 to tank 21 for reuse.

The flow of liquid from the filters 38, 39 is controlled by valves 45, 46, 47, 48 and by manipulation of these valves a portion of the liquid from either of the filters 38 or 39 may be conducted through conduit 49 or 50 to cooling tank 12.

The filters 38, 39 are designed for alternate use under control of the valves described in an obvious manner. When one of the filters has become clogged with sulphur flow of liquid from the drum 30 may be shifted from the clogged filter to the clear filter and wash water may be introduced into the clogged filter from fitting 51 by manipulation of valve 52 or 53. The wash water may be conducted to the cooling tank 12 through conduit 49 or 50 by manipulation of valves 47 or 48.

To gather the sulphur extracted by means of the filters 38 or 39, the filter in the cleaning operation thereof may be opened and the sulphur dropped upon an apron 54 which is shown as inclining toward a conveyor 55 which conveyor may then carry the sulphur to discharge and for storage.

A certain proportion of the warmed cooling liquid from tank 12 may be discharged into the supply conduit 23 by opening the valve 56, the mixture of this warmed liquid with the activated liquid from tank 21 being so manipulated as to provide a treating liquid of the desired temperature.

In accordance with the invention the tube 29 is shown as provided with sections, any number of which may be utilized, three being shown in the drawings.

The different sections of tube 29 are shown as connected to fittings 57 in which are housed bearing arms 58 in which arms are journaled the ends of the shaft of a spiral conveyor 59 mounted to revolve freely in the bearings. The mixture of gas and liquid being injected into the tube 29 under high pressure causes revolution of the spiral 59 thereby providing for a very thorough mixing of the liquid with the gas to be treated and sulphur deposited in the tube 29 by the action of the oxides of sulphur upon the hydrogen sulphide in the gas will be carried forward by action of the spiral and discharged into the drum 30 where it will settle at the bottom of the drum and be carried out with the liquid withdrawn therefrom or may be removed in any desired manner.

The reactivating tower of this form of the invention comprises inclined perforated baffle plates 60 supported upon spacing columns 61 and a bottom column 70 shown as mounted upon a spider 71 in spaced relation to the bottom of the tower. A centering column 72 is also shown at the top of the tower held in position by means of a spider 73. The lower edges of the baffle plates 60 are shown as terminating short of the inner surface of the drum as indicated at 74, being otherwise in contact with the inner surface of the tower.

In the form of the invention shown in Figs. 7–11 inclusive the gas and liquid contact tube is shown as made up of a series of sections 75 each in the form of a Venturi tube, each section flanged at its ends for connection to the adjacent sections or the apparatus at each end of the tube.

Between the flanges of the ends of the sections 75 there is shown a perforated plate, illustrated in side elevation in Fig. 11 and shown as a disc 76 having openings 77 in its lower half, certain of said openings being counter-sunk from each direction. The two lowermost openings are shown as being not so counter-sunk. To one end of the contact tube thus formed, the Y fitting 26′ is shown attached through which the gas to be treated and the treating liquid are introduced and the opposite end is shown as attached adjacent the bottom of the separating drum 78.

The drum 78 differs from the drum 30 above described in that a tortuous passage is provided for the passage of gas therethrough and its consequent separation from the treating liquid. To provide such tortuous passage the lower portion 79 of the drum is formed with a flange 80 to which is secured the flanged upper portion 81 having an inner annular shoulder 82 upon which are seated alternately the elements shown in plan view in Figs. 9 and 10.

The elements 83, 84 comprise a plurality of U-shaped members 85 having their legs directed downwardly and the webs connected by means of cleats 86, 87. The members 85 in the elements 83, 84 are so arranged as to stagger with the elements above and below when placed in the drum, as indicated in Fig. 8, and the cleats 86, 87 are placed at different angles across the elements so as not to fall directly above each other when assembled.

When assembled in the drum the lowest element 83 or 84 seats upon the shoulder 82 and each succeeding element 83 or 84 rests upon the cleats 86 or 87 of the element below, the spaces between the members 85 in every case standing above the horizontal web of member 85 in the next lower element. Gas carrying liquid therewith passing upward through the drum will thereby be caused to pass through a tortuous path and the liquid will be separated from the gas, dripping downwardly from the U-shaped members and collecting in the bottom of the drum whence it may be drawn off in a manner described in connection with drum 30 in Figs. 1 to 3 inclusive, the gas escaping through the fitting 88.

The liquid from the drum in this form of the apparatus may be drawn off through a conduit attached to fitting 89 which may be equipped with the liquid level control device as indicated at 34, Fig. 1.

By virtue of the Venturi tube form of the sections of the tube 75, the mixture of liquid and gas will flow through each section with the least possible internal resistance and a very thorough contact between the liquid and gas will be provided by the presence of plates 76. The openings in the plates 76 for the passage of the mixture of gas and liquid being in the bottom portion thereof, any precipitated sulphur will be swept along with the current of the liquid, and gas which tends to separate from the liquid by gravity will be compelled to pass downwardly to go through the openings 76 with the liquid.

Supports for the sections 75 are indicated at 90, Fig. 7, and it will be understood that any desirable number of these sections may be utilized in series.

In Figs. 12, 13, and 14, a modified form of activating tower is shown which is similar to the gas and liquid separation drum 79. In this form of tower activating liquid is introduced at the top and falls downwardly upon the elements 91, 92, which elements are made up of U-shaped members 93, the lowermost element resting upon internal annular flange 94 carried by the upper portion 95 of the tower. The portion 95 of the tower is shown as flanged at 96 for connection with flange 97 of the lower portion 98 of the tower.

The members 93 of elements 91 and 92 are shown as so connected to the cleats 99 and 100 as to have the spaces therebetween in staggered relation with the element 91 or 92 above or below the same, in the same manner as described in connection with elements 83, 84 of Figs. 8, 9, and 10 and the cleats 99, 100 which serve to hold the elements 91, 92 in assembly and also act as separators therefor in the tower are so placed upon the elements as to fall in staggered relation in the assembly.

Liquid delivered to the top of the tower and falling upon the elements 91, 92 will pass through the spaces between the elements dripping upon the horizontal web of the member below each space and thus from element to element in contact with gas delivered to the bottom of the tower as through a perforated conduit 101.

A sight glass 102 is shown whereby the height of the liquid gathering in the bottom of the tower may be ascertained.

It will be understood that sulphur oxide gas may be delivered to the bottom of the tower 98 in the same manner as to tower 20, Figs. 1 and 2, from a sulphur burner and that the liquid gathered in the bottom of the tower is drawn off for use in the manner described in the first embodiment of the invention.

By virtue of the construction and arrangement of the apparatus large volumes of gas may be treated in a short space of time, the gas being brought into intimate contact with the treating liquid and since the gas most highly charged with hydrogen sulphide is first brought into contact with the most active treating liquid and since as the gas to be treated loses its hydrogen sulphide it is then in contact with less active treating liquid towards the discharge end of the tube 29 or 75, the gas will be treated in the most efficient manner with the least possible waste of sulphur oxide.

The apparatus requires a minimum of power for its operation and the heat losses are brought to a minimum by utilizing the unwanted heat in the freshly burned oxides of sulphur to warm the active liquid to its most efficient temperature.

Minor changes may be made in the physical embodiment of the invention within the scope of the appended claims without departing from the spirit of the invention.

I claim:

1. A cyclic gas treating apparatus comprising, in combination, a gas and liquid contact device, means to supply gas to be treated and active liquid for treatment of the gas to said device for flow therethrough in the same direction, means to separate treated gas from the treating liquid, a filter for used liquid, a reactivating tower for preparing the liquid for reuse, means to cause counterflow of spent treating liquid and reactivating gas through said tower, and means to introduce the reactivated liquid into the contact device.

2. A gas treating apparatus comprising, in combination, a gas and liquid contact device, a drum having a baffle therein against which the gas and liquid are discharged from said device, means to draw off gas from said drum, means to draw liquid from said drum, a filter in communication with said last named means, a reactivating tower, means to conduct filtered liquid to the top of said tower, means to introduce a reactivating gas into the bottom of said tower and means to conduct liquid from the bottom of said tower and to introduce the same into said first named device.

3. A gas treating apparatus comprising, in combination, a tubular gas and liquid contact device, means to inject gas to be treated into said device and means to introduce treating liquid into said device under pressure, means connected with the outlet of said device to separate treated gas from the liquid, means to filter the used liquid, means to reactivate the filtered liquid and means to conduct activated liquid to said liquid introducing means.

4. A gas treating apparatus comprising, in combination, a tubular gas and liquid contact device having means therein to cause mixture of the gas to be treated with a treating liquid, means to introduce gas to said device and means to introduce treating liquid thereinto under pressure, means to separate treated gas from the treating liquid, means to separate material removed from the gas from the treating liquid, a reactivating tower for the treating liquid, a sulphur burner for producing reactivating gas, means to cool said reactivating gas, means to conduct reactivated liquid to said liquid introducing means and means to supply heated liquid from said cooling means into said liquid introducing means.

5. A gas treating apparatus comprising, in combination, a gas and liquid contact device comprising a tube having Venturi characteristics, means to introduce gas to be treated into said tube, means to introduce treating liquid into said tube under pressure whereby to mix with said gas, means to separate treated gas from treating liquid connected to said tube, said means having an outlet for treated gas and for liquid separated therefrom, means to separate material removed from the treated gas from said treating liquid, gas and liquid contact reactivating means for said used liquid, a sulphur burner to produce reactivating gas, liquid cooled coils for reducing the temperature of the reactivating gas, said coils connected with said reactivating means, means to supply reactivated liquid mixed with heated liquid from said cooling to said liquid introducing means.

6. A gas treating apparatus comprising, in combination, a gas and liquid contact device, means to introduce gas to be treated and treating liquid respectively into said contact device, means to separate treated gas from the treating liquid, a pair of filters connected to said separating means, a reactivating tower, means to conduct liquid from either of said filters to said tower, a plurality of valves and conduits arranged to pass liquid through either of said filters while the other thereof is out of use, a sulphur burner for producing reactivating gas, liquid submerged coils in communication with said burner, a blower connected with said coils and with said tower, means to conduct liquid from either of said filters to the space about said coils, means to conduct liquid from said tower and from said space to said introducing means for treating liquid.

7. A gas treating apparatus comprising, in combination, a gas and liquid contact device, means for introducing gas to be treated and an active treating liquid respectively into said device, means for separating treated gas from the treating liquid, a pair of filters in communication with said last named device arranged for alternate use, inclined surfaces arranged below said filters, a conveyor toward which said surfaces incline for removal of solids taken from said filters, means to reactivate filtered treating liquid and means to conduct the reactivated liquid to the treating liquid introducing device.

8. A gas and liquid contact device comprising a tubular member, a spiral conveyor freely revoluble therein, means to introduce gas to be treated axially of the said tube, means to inject liquid under pressure into said tube into contact with gas entering the same whereby to cause revolution of said conveyor to mix said gas and liquid and to remove material deposited therein.

9. A gas and liquid contact device comprising, in combination, a plurality of connected Venturi tube sections, perforated mixing plates inserted in the unions between said sections, means to introduce liquid and gas to be contacted therewith adjacent the free end of one of said sections.

10. A gas and liquid contact device comprising, in combination, a plurality of connected Venturi tube sections, diaphragms separating said sections, said diaphragms perforated in their lower portions and imperforate in their upper portions, means to introduce gas axially of said device at one end thereof and means to introduce liquid to be contacted therewith adjacent said gas supply.

11. A reactivating tower comprising, in combination, a vertically arranged cylindrical member open at its top and closed at its bottom, a plurality of baffle plates vertically spaced in said member, sloping downwardly alternately in opposite directions, said plates having slotted perforations at right angles to the inclination thereof, said plates freely contacting the inner surface of the member except at the lower edge of each, a central, sectional column, said sections having screw-threaded connections with each other and with said plates whereby the assembly of plates and column sections may be freely withdrawn through the top of the tower and may be disassembled as withdrawn for cleaning.